United States Patent
Ram et al.

(10) Patent No.: US 11,624,941 B2
(45) Date of Patent: Apr. 11, 2023

(54) BIPOLAR JUNCTION TRANSISTOR OPTICAL MODULATOR

(71) Applicant: Massachusetts Institute of Technology, Cambridge, MA (US)

(72) Inventors: Rajeev J. Ram, Arlington, MA (US); Marc De Cea Falco, Cambridge, MA (US); Jin Xue, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 111 days.

(21) Appl. No.: 17/227,457

(22) Filed: Apr. 12, 2021

(65) Prior Publication Data
US 2021/0389612 A1 Dec. 16, 2021

Related U.S. Application Data

(60) Provisional application No. 63/037,676, filed on Jun. 11, 2020.

(51) Int. Cl.
*G02F 1/025* (2006.01)

(52) U.S. Cl.
CPC .................. *G02F 1/025* (2013.01)

(58) Field of Classification Search
CPC ..... G02F 1/01708; G02F 1/025; G02F 1/2257
USPC ....................................................... 385/1–3
See application file for complete search history.

(56) References Cited

U.S. PATENT DOCUMENTS

| | | | |
|---|---|---|---|
| 4,958,898 A * | 9/1990 | Friedman | G02F 1/025 257/350 |
| 4,997,246 A * | 3/1991 | May | G02F 1/025 385/2 |
| 5,109,263 A | 4/1992 | Nanba et al. | |
| 6,198,853 B1 * | 3/2001 | Yamada | G02F 1/025 257/458 |
| 7,764,850 B2 * | 7/2010 | Bratkovski | G02F 1/025 385/39 |
| 9,405,137 B2 * | 8/2016 | Manouvrier | G02F 1/025 |
| 10,996,538 B2 | 5/2021 | Popovic et al. | |
| 11,444,696 B2 * | 9/2022 | Dutt | H04J 14/02 |
| 2003/0109109 A1 | 6/2003 | Freeman et al. | |
| 2005/0051767 A1 | 3/2005 | Leon et al. | |
| 2007/0031080 A1 * | 2/2007 | Liu | G02F 1/025 385/3 |

(Continued)

FOREIGN PATENT DOCUMENTS

WO      2003096404 A1      11/2003

OTHER PUBLICATIONS

"Ring resonator silicon optical modulator based on interleaved PN junctions" by Ziebell et al, Proc. SPIE 8431, Silicon Photonics and Photonic Integrated Circuits III, 84310J (Year: 2012).*

(Continued)

*Primary Examiner* — Robert Tavlykaev
(74) *Attorney, Agent, or Firm* — Smith Baluch LLP

(57) ABSTRACT

Semiconductor optical modulators are described that utilize bipolar junction transistor (BJT) structure within the optical modulator. The junctions within the BJT can be designed and biased to increase modulator efficiency and speed. An optical mode may be located in a selected region of the BJT structure to improve modulation efficiency. The BJT structure can be included in optical waveguides of interferometers and resonators to form optical modulators.

20 Claims, 6 Drawing Sheets

(56) References Cited

U.S. PATENT DOCUMENTS

| | | | |
|---|---|---|---|
| 2007/0104407 | A1 | 5/2007 | Mitomi et al. |
| 2007/0201523 | A1 | 8/2007 | Walter et al. |
| 2008/0138023 | A1 | 6/2008 | Williams et al. |
| 2008/0199123 | A1 | 8/2008 | Pan et al. |
| 2009/0310901 | A1* | 12/2009 | Dong ............... G02F 1/025 |
| | | | 385/3 |
| 2010/0078623 | A1 | 4/2010 | Feng et al. |
| 2014/0376853 | A1 | 12/2014 | Hashimoto |
| 2016/0043203 | A1 | 2/2016 | Alperstein et al. |
| 2016/0322779 | A1 | 11/2016 | Cai et al. |
| 2017/0040487 | A1* | 2/2017 | Alloatti ............ H01L 31/03529 |
| 2018/0210242 | A1* | 7/2018 | Baehr-Jones ........... G02F 1/015 |
| 2019/0180065 | A1 | 6/2019 | Babakhani et al. |

OTHER PUBLICATIONS

"Three-Port Optical Phase-Shifters and Modulators With Ultra-High Modulation Efficiency, Positive RF-Linking Gain, and Low Residual Amplitude Modulation" by Chao et al, IEEE Access, vol. 8, pp. 80836-80841 (Year: 2020).*

"Ultrashort SiGe Heterojunction Bipolar Transistor-Based High-Speed Optical Modulator" by Wu et al, IEEE Journal of Selected Topics in Quantum Electronics, vol. 19, No. 2, 7900109 (Year: 2013).*

International Search Report and Written Opinion in International Patent Application No. PCT/US2021/026777 dated Jul. 9, 2021, 11 pages.

* cited by examiner

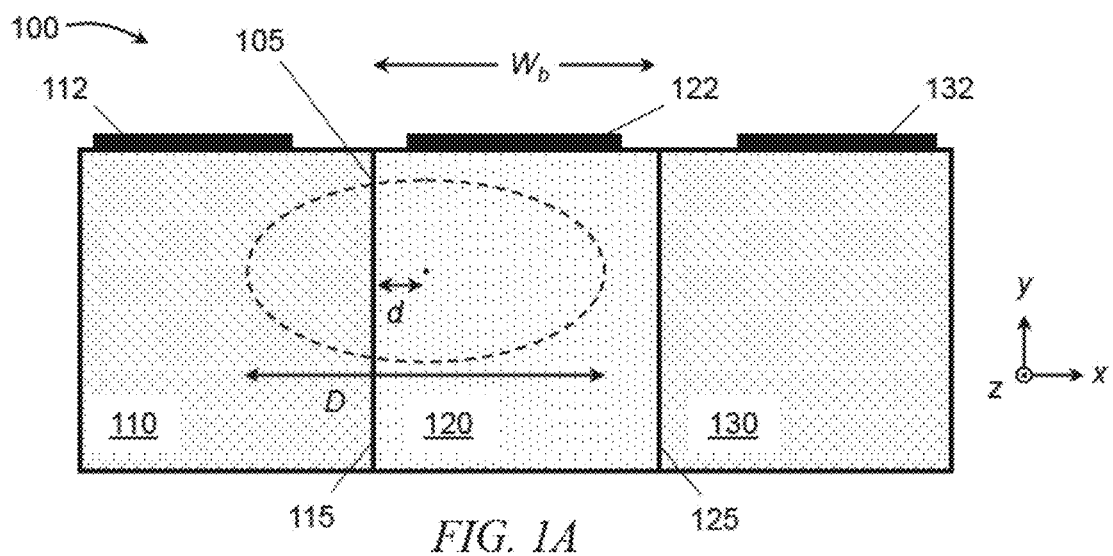
*FIG. 1A*
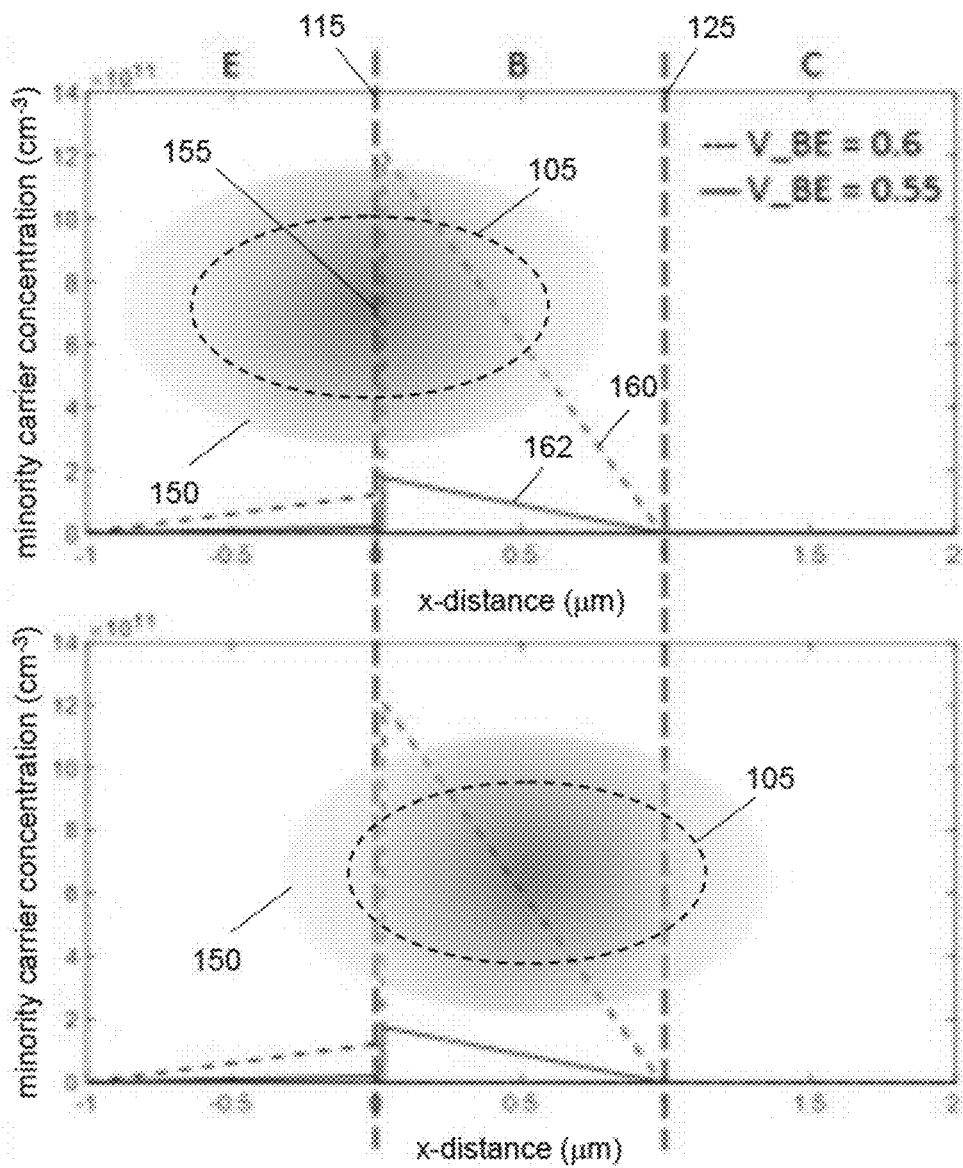
*FIG. 1B*
*FIG. 1C*

BIPOLAR JUNCTION TRANSISTOR OPTICAL MODULATOR

CROSS-REFERENCE TO RELATED APPLICATION

The present application claims a priority benefit, under 35 U.S.C. § 119(e), to U.S. Application No. 63/037,676 filed on Jun. 11, 2020, titled "Bipolar Junction Transistor Optical Modulator," which application is incorporated herein by reference in its entirety.

GOVERNMENT SUPPORT

This invention was made with Government support under W911NF-19-2-0114 awarded by the Army Research Office (ARO). The Government has certain rights in the invention.

BACKGROUND

Silicon optical modulators that use semiconductor p-n junctions and are based on the plasma dispersion effect are usually operated in a reverse bias regime (V<0). Reverse bias is used because it can reduce power consumption by the optical modulator. Reverse bias can also increase the modulation speed of the modulator allowing an increased signal bandwidth. However, reverse bias can incur a reduced modulation efficiency, such that the modulation voltage is higher and must swing over a large range to achieve sufficient ON/OFF ratio of an optical wave operated on by the optical modulator.

SUMMARY

The described embodiments relate to optical modulators that utilize semiconductor bipolar junction transistor (BJT) structures. The BJT structure can be formed in one or more waveguides of an optical device, electrically biased, and electrically modulated to provide optical modulation of an optical wave passing through the optical device. The optical-mode profile of the wave passing through the device may be located in a selected location with respect to the BJT structure to improve modulation efficiency. The BJT structure may be designed and biased to increase modulation speed and modulation efficiency compared to conventional optical modulators.

Some implementations relate to an optical device to modulate an optical wave passing through the optical device. The optical device can include an optical waveguide, a first doped region in the optical waveguide forming an emitter of a bipolar junction transistor, a second doped region in the optical waveguide forming a base of the bipolar junction transistor, and a third doped region forming a collector of the bipolar junction transistor. A base-emitter junction comprising the base and the emitter can be configured to operate in a forward-bias mode and a base-collector junction comprising the base and the collector can be configured to operate in a reverse-bias mode to modulate the optical wave.

Some implementations relate to a method of modulating an optical wave. The method can include acts of: passing the optical wave through an optical waveguide containing at least a portion of a bipolar junction transistor (BJT) structure, wherein a peak intensity of the optical wave passes within 300 nm of a peak change in an injected minority-carrier concentration within a base of the BJT structure; electrically modulating, under forward-bias conditions, a base-emitter junction of the BJT structure to change the injected minority-carrier concentration; and reverse biasing a base-collector junction of the BJT structure to remove minority carriers from a base of the BJT structure.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

FIG. 1A illustrates a lateral bipolar junction transistor structure that can be used for optical modulation.

FIG. 1B plots minority carrier concentrations and a cross-section (transverse optical mode profile) of an optical wave propagating within the bipolar junction transistor structure of FIG. 1A.

FIG. 1C plots minority carrier concentrations and another location for the optical mode within the bipolar junction transistor structure of FIG. 1A.

DETAILED DESCRIPTION

Figure 2A:
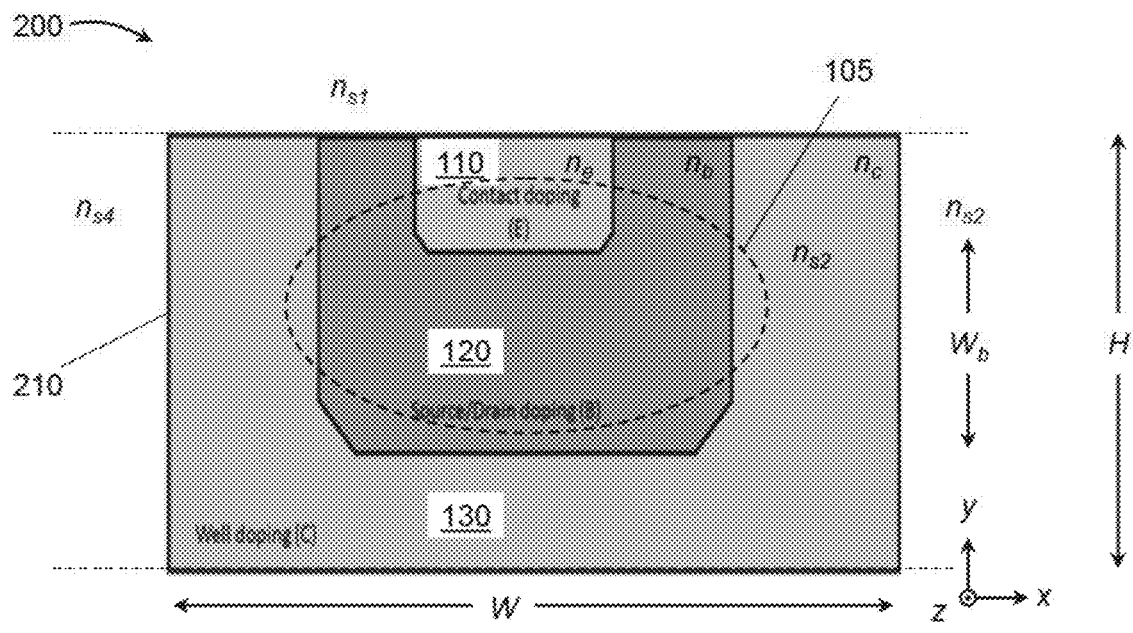
FIG. 2A depicts a waveguide having a vertical BJT structure formed therein.

Conventional semiconductor optical modulators having p-n junctions, when operated in the forward bias regime, can exhibit high modulation efficiencies. However, forward bias can incur a higher power consumption and a reduced modulation speed compared to reverse-biased optical modulators. The higher power consumption results from larger currents that flow during forward bias. The reduced modulation speed is governed by the recombination lifetime (on the order of hundreds of nanoseconds to microseconds) of the injected minority carriers remaining in the active region of the modulator. For silicon with an impurity doping concentration of about $5 \times 10^{18}$ cm$^{-3}$, the recombination time is on the order of 1 microsecond. When the modulator transitions to an off state in which free minority carriers are no longer being injected into the device, the previously-injected minority carriers should be cleared from the active region of the device. Because the clearing of the minority carriers is mainly by recombination, the time to remove the minority carriers usually requires times on the order of hundreds of nanoseconds to microseconds.

Described herein are apparatus and methods for implementing a high-speed, high-signal-bandwidth, forward-biased, semiconductor optical modulator. High-speed modulation of an optical wave can be achieved with a bipolar junction transistor (BJT) structure that is biased and designed to sweep injected minority carriers away from the area where an optical wave passes through the BJT structure. The BJT structure can be formed, at least in part, in an optical waveguide. The modulation speed of such optical modulators can increase up to a factor of 10 or more compared to conventional forward-biased modulators, e.g., from about 500 megahertz (MHz) for some conventional forward biased modulators to 10 GHz or more with the optical modulators disclosed herein. The modulation speed (or 3 dB modulation frequency) is defined as the frequency at which a modulation depth of an optical wave (in phase or amplitude) rolls off to one-half the modulation depth at low frequency (e.g., at 1 MHz). Having such high modulation speeds allows the optical modulators to modulate optical waves at a frequency or with one or more frequency components in the range from 1 GHz to 10 GHz.

The optical modulators described herein may include active regions formed from conventional semiconductor materials such as silicon, silicon carbide, germanium, silicon germanium, indium phosphide, gallium arsenide, and gallium nitride among other compositions. An active region of the modulator is a region in which an optical wave to be modulated passes through and in which an electrical field is applied to modulate the optical wave. An optical modulator of the disclosed implementations can include a bipolar junction transistor (BJT) structure that lies at least partly in an active region of the optical modulator.

FIG. 1A illustrates a simple lateral BJT structure 100 that can be included in a high-speed optical modulator. The simple BJT structure is used for explanation purposes. The BJT structure includes an emitter 110, a base 120, and a collector 130. A lateral BJT has lateral or horizontal base-emitter and base-collector junctions. Each region of the BJT may have a metal contact and/or heavily-doped semiconductor contact: emitter contact 112, base contact 122, collector contact 132. The contacts may connect to wire bonds and/or metal interconnects patterned on the substrate. The base 120 may be doped to have a different conductivity type than the emitter 110 and collector 130. For example, the emitter-base-collector conductivity type can be n-p-n or may be p-n-p. In some cases, one or more intrinsic regions of semiconductor may be included at least part way along the base-emitter (BE) junction 115 and/or along the base-collector (BC) junction 125 to form a p-i-n or n-i-p junction at the BE and/or BC junctions. Intrinsic semiconductor may not be included within a selected region 105.

The selected region 105 can be located within the BJT structure and is a region through which an optical wave passes during operation of the BJT structure (e.g., during modulation of the optical wave by the BJT structure). The optical wave can have a transverse optical mode or intensity profile, such as a Gaussian mode profile. The selected region 105 can be a region within which a peak intensity of the transverse optical mode profile down to a 1/e intensity value is contained. The selected region 105 can also overlap with one or more regions in the BJT structure having peaks in, and/or peak changes in, minority-carrier concentrations when the BJT structure is modulated. An active area of the BJT structure can include the selected region 105 and may extend beyond the selected region 105.

When the BJT is located in an optical waveguide, such as in optical devices described below, the selected region 105 can be a region encircling the peak intensity of a transverse intensity profile for an optical wave having an operating wavelength that will propagate along the waveguide during operation of the device. The location and shape of the transverse intensity profile of the optical wave is determined, at least in part, by physical parameters of the waveguide and surrounding regions. These physical parameters can include: the operating wavelength of the optical wave, refractive index values of the emitter 110, base 120, and collector 130 materials, refractive index values of one or more surrounding (cladding) material(s) such as an oxide, polymer, air, metal, or some combination thereof, dimensions of the waveguide core, radius of curvature of the waveguide core, and arrangement of optical coupling structure to couple the optical wave into the optical waveguide. Generally, the waveguide core has a higher refractive index than the cladding material(s).

To obtain high modulation speeds, the BE junction 115 of the BJT structure 100 can be modulated in a forward-biased mode and the BC junction 125 can be reverse-biased. The reverse bias from base 120 to collector 130 causes the minority carriers that are injected into the base 120 during a portion of the modulation cycle (e.g., during the ON portion) to diffuse quickly to the depletion region at the BC junction 125 (e.g., during the OFF portion) where the injected minority carriers can be swept to the collector 130 (and away from the selected region 105 where the optical mode is concentrated). Boundary conditions in the active region force the minority carrier concentration to be close to zero at the BC junction 125 (as depicted in FIG. 1B), which assists the quick diffusion and removal of injected minority carriers from the base 120. Additionally, the width of the base $W_b$ can be kept small (e.g., between 20 nm and 800 nm) to reduce the transit distance to the collector. In this manner, the removal of injected minority carriers from the base (and modulation speed of the optical modulator) is governed primarily by rapid diffusion to the BC junction 125 and sweeping of the minority carriers into the collector 130. As such, the speed of the optical modulator is no longer limited by the time it takes for the injected minority carriers to recombine in the base. The time it takes for the injected minority carriers to diffuse and be swept away from the base can be orders of magnitude shorter than the time it takes for the carriers to recombine in the base.

FIG. 1B plots minority carrier concentrations 160, 162 under two different forward bias values for the BE junction 115 of the BJT structure of FIG. 1A. For the plotted results, the BC junction 125 is reverse-biased at −1 V while the BE junction is forward-biased. FIG. 1B also shows a possible location for an optical mode 150 of an optical wave that passes through the BJT structure. The optical mode 150 may have a Gaussian intensity profile with a peak intensity 155 at or within 10% of a spatial center of the optical mode 150.

For the illustration of FIG. 1B, the optical mode's intensity profile (in the x and y directions) is transverse to a direction of propagation of the optical wave, which can be into or out of the drawing sheet (±z directions).

In some implementations, the optical mode 150 could be centered at or near the BE junction 115, so that a peak intensity 155 of the optical mode 150 can be located at or within 300 nm from a peak of the injected minority carrier concentration in the BJT structure when forward biased. For example, the selected region 105 for the optical mode may straddle the BE junction 115, lie partly in the emitter 110 and partly in the base 120. A center of the selected region 105 can be located within 300 nm of the BE junction 115. There may be no portion of the selected region 105 lying in the collector 130, or there may be a portion that is less than 20% of the area of the selected region 105 that lies in the collector 130.

Referring to FIG. 1A, in some cases the center of the BE junction 115 may lie a distance d from a center of the selected region 105, where d is no more than 20% of the diameter D across the selected region 105 in a direction from emitter to collector (x-direction in the drawing). In some cases, D is the diameter of a circular selected region 105 or is the length of a major axis of an elliptical selected region 105. In such a location as depicted in FIG. 1A, the peak intensity 155 of the optical mode 150 and a surrounding region having an intensity down to 80% of the peak intensity may overlap the largest changes in minority-carrier concentration as the BJT structure is electrically modulated.

With the selected region 105 located mostly or entirely within the emitter 110 and base 120, the modulation efficiency is higher than if the selected region were located near the BC junction 125. The increased modulation efficiency is because the largest change in minority-carrier concentration due to a change in base voltage occurs essentially at the BE junction, as can be seen in FIG. 1B. The plots of minority-carrier concentrations (160, 162) show a change of about a factor of 6 at the BE junction 115 when the base-to-emitter voltage changes by only 50 mV ($V_{BE}$=0.6 V, dashed line 160; $V_{BE}$=0.55 V, solid line 162). The change in minority-carrier concentration at the BE junction 115 can depend upon semiconductor materials chosen and dopant density. According to some implementations, the peak change in minority-carrier concentration at the BE junction can be from a factor of 2 to 1000 or more for a change in base-to-emitter voltage between 2 mV and 100 mV. The amount of change depends upon the amount of forward bias applied to the BE junction 115.

Because the injected minority-carrier concentration is not zero throughout the emitter 110 where there can be an overlap with the optical mode 150, it can be beneficial to remove these carriers from the emitter region as well as the base 120 to increase the speed of the optical modulator. To improve minority-carrier extraction capabilities from the emitter 120, the length of the emitter region can be made short enough so that the transit time of the carriers from the BE junction 115 to the emitter contact 112 does not appreciably limit the modulator's response. For example, the length of the emitter from the BE junction 115 to the emitter contact 112 can be between 40 nanometers (nm) and 1 micrometer (μm).

FIG. 1C plots minority-carrier concentrations and an optical mode 150 located in a different area within the BJT structure of FIG. 1A. The center of the selected region 105 may be located between the BE junction 115 and the BC junction 125 (e.g., the optical mode 150 may be centered in the base 120). Portions of the selected region 105 may extend into the emitter 110 and collector 130. In this configuration the modulation efficiency of the optical modulator may not be as high as for the case depicted in FIG. 1A, but the effect of emitter length on minority-carrier extraction can be significantly less than for the case depicted in FIG. 1A. The reduced effect on emitter length can allow larger emitter regions, which may make fabrication of the optical modulator easier.

FIG. 1B and FIG. 1C show two approximate bounds for the location of the selected region 105. For some optical modulators, the selected region 105 can be located between the two approximate bounds shown in FIG. 1B and FIG. 1C. The positioning of the selected region 105 (and optical mode 150) can depend on factors including, but not limited to, doping concentrations and/or doping profiles in the emitter 110 and base 120, location and structure of electrical contacts to the emitter 110, base 120, and collector 130, waveguide structure in which at least part of the BJT structure 100 is incorporated (e.g., ridge waveguide or rib waveguide), the type of optical modulator into which the BJT structure is incorporated (e.g., ring resonator, Mach-Zehnder interferometer). Dopant concentrations in the emitter 110, base 120, and collector 130 may be in a range from $10^{17}$ cm$^{-3}$ to $10^{19}$ cm$^{-3}$. In some implementations, at least portions of each of the emitter 110, base 120, and collector 130 are located within an optical waveguide of an optical modulator. In some cases, the collector may not be located within the optical waveguide and may be located adjacent to the optical waveguide that includes at least portions of the emitter 110 and base 120.

FIG. 2A through FIG. 2F depict ways in which a BJT structure 100 can be incorporated into a waveguide of an optical device such as an optical modulator. When incorporated into an optical device, one or more BJT structures 100 may be patterned and formed, at least partly, into one or more waveguides of the optical device. The patterning may be done using one or more conventional lithography techniques (e.g., photolithography, electron-beam lithography, etc.) and the forming may be done using conventional microfabrication techniques (e.g., some or all of reactive ion etching, ion implantation, diffusion, thermal annealing, thermal oxidation, sputtering, chemical vapor deposition, physical deposition, etc.).

FIG. 2A depicts an end-on elevation view of a waveguide 210 having a vertical BJT structure 200 formed therein. A vertical BJT structure includes vertical base-emitter and base-collector junctions. The waveguide 210 may be a rib waveguide, a ridge waveguide, or may be buried in surrounding material in a substrate. The vertical BJT structure 200 may be formed in part by patterned ion implantation (e.g., using hard masks) and thermal diffusion of dopants. For example, a first deep well may be formed by implanting dopant atoms (e.g., boron, arsenic, phosphide, or another dopant) through an opening in a first hard mask into a semiconductor substrate to form a deep collector 130. A second well may be formed by implanting into the substrate, through a second opening in a second hard mask, second dopant atoms to produce an opposite conductivity type semiconductor for the base 120. The second implantation can use less energy to implant the dopant atoms at a shallower depth than the first dopant atoms. A third shallow implantation can be performed by implanting third dopant atoms through a third opening in a third hard mask into the substrate to form the emitter 110.

In some cases, three different hard masks may be used with each successive mask having a narrower opening than the previous mask. Thermal diffusion and activation of dopants may be done after all three implantations of dopants. In other cases, a same hard mask can be used for all three implants, and different thermal diffusion steps may be performed after each implantation to broaden the distribution of dopants more in a previous implantation compared to a successive implantation. In some cases, a mix of the two approaches may be used. For example, a same hard mask may be used for two of the implantation steps (e.g., the first two or last two implantation steps) and a different hard mask can be used for the other implantation step.

An optical mode may be centered on the selected region 105 and travel along the z direction in the waveguide 210. The selected region 105 can be located as described above in connection with FIG. 1A through FIG. 1C. For an example case where the depicted emitter 110, base 120, and collector 130 form a waveguide core, the peak intensity of the optical wave's transverse intensity profile can be determined by the operating wavelength of the device, the waveguide's height H, width W, refractive index values of the emitter $n_e$, base $n_b$, and collector $n_c$, refractive index values ($n_{s1}, n_{s2}, n_{s3}, n_{s4}$) of one or more surrounding materials adjacent to the waveguide core, and radius of curvature of the waveguide core (e.g., when formed in a ring or racetrack resonator). If the waveguide core is embedded in only an oxide or nitride, then there may be only one refractive index value for the cladding material. By adjusting dimensions of the waveguide (H, W), dimensions of the emitter, base, and collector, radius of curvature of the waveguide core, and/or one or more of the above refractive index values (through choice of materials and/or impurity doping or processing parameters), the optical mode and selected region 105 can be located at a desired position within the waveguide 210 (e.g., to overlap a peak intensity of the optical mode with peaks in, and/or peak changes in minority-carrier concentrations).

The width of the base $W_b$ may be measured vertically in the structure of FIG. 2A (along the y direction) and may be between 20 nm and 800 nm. In some implementations, an intrinsic (undoped) region of semiconductor (not shown) may be located between the base 120 and emitter 110. Additionally or alternatively, an intrinsic region of semiconductor (not shown) may be located between the base 120 and collector 130. Such intrinsic region(s) may be included on the devices described below and can reduce junction capacitance of the BE junction 115 and/or BC junction 125. The reduction in junction capacitance can reduce the RC time constant of the optical modulator and improve its modulation speed.

Figure 2B:
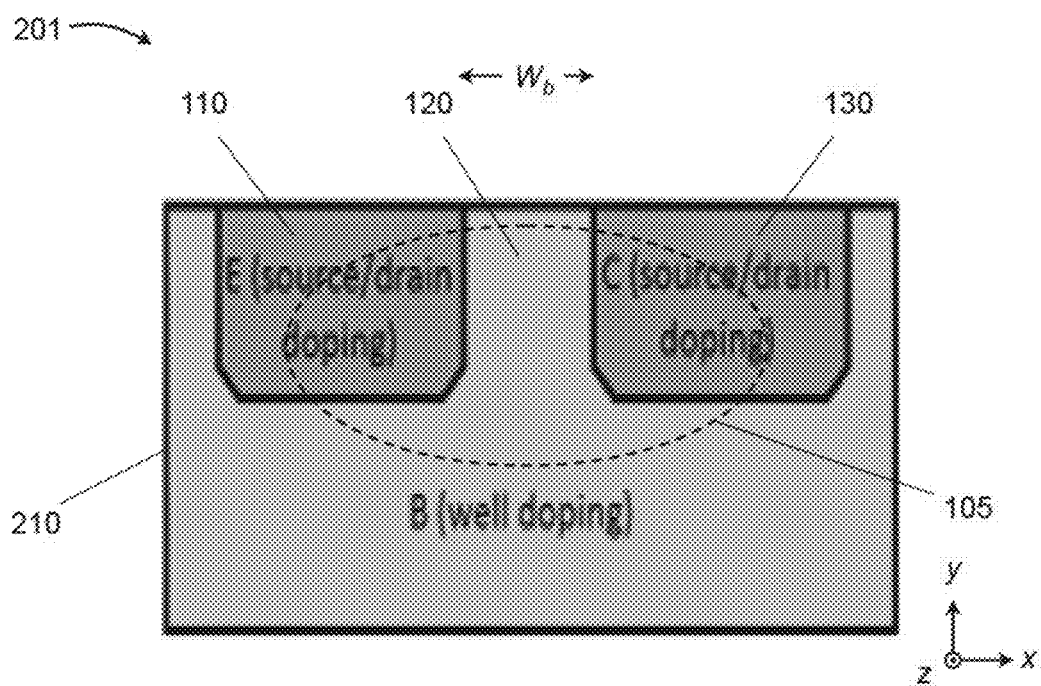
FIG. 2B depicts a waveguide having a lateral BJT structure formed therein.

FIG. 2B depicts a waveguide 210 having a lateral BJT structure 201 formed therein. The structure can be similar to that shown in FIG. 1A, though the doped region for the base 120 may extend deeper into the substrate than the doped regions for the emitter 110 and collector 130. The width of the base $W_b$ between emitter and collector may be measured laterally across the substrate (along the x direction) and may be between 20 nm and 800 nm. An optical mode may be centered on the selected region 105 and travel along the z direction in the waveguide 210. The selected region 105 can be located as described above in connection with FIG. 1A through FIG. 1C.

Figure 2C:
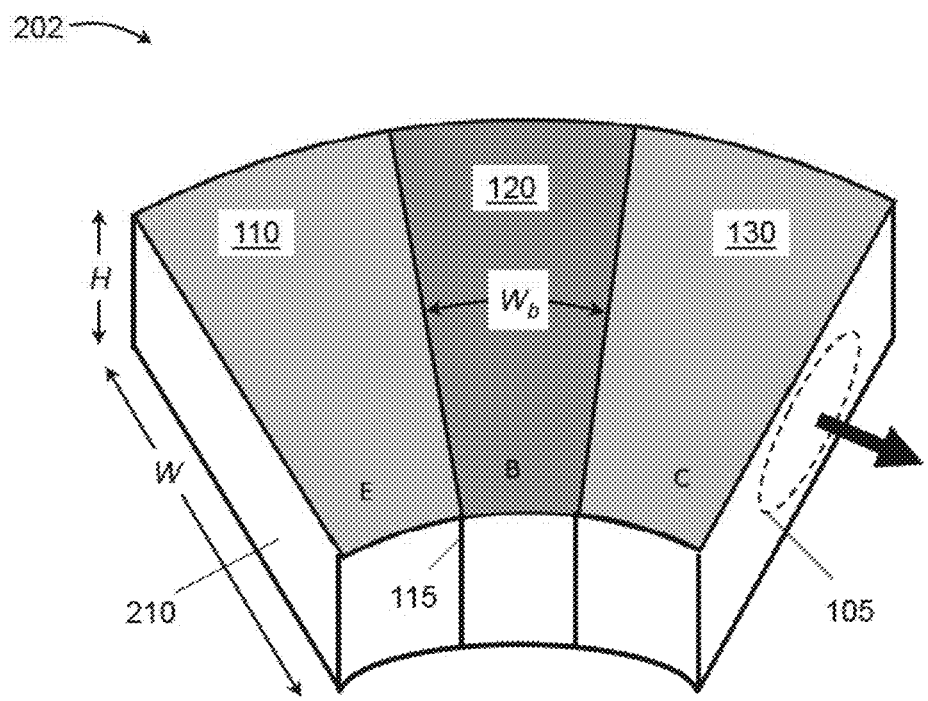
FIG. 2C depicts a curved waveguide having an interleaved BJT structure formed therein.

FIG. 2C depicts a perspective view of a portion of a curved waveguide 210 having an interleaved BJT structure 202 formed therein. The curved waveguide 210 may be part of a longer waveguide in a ring resonator, racetrack resonator, or Mach-Zehnder interferometer, for example. In such a structure, the emitter 110, base 120, and collector 130 may be repeated along the length of the waveguide 210 in alternating orientations forming an interleaved structure. For example, the sequence of emitter, base, and collector regions may occur as follows along the length of the waveguide 210 (emitter-base-collector-base-emitter-base-collector-base . . . ). An example of such a sequence is shown in the ring resonator of FIG. 5.

For the BJT structure 202 and waveguide 210 of FIG. 2C (and for the waveguides of FIG. 2D through FIG. 2F), the optical mode travels along a circumferential, arced, oval, or circular path, indicated by the heavy arrow. The location of the optical mode (and selected region 105) can be determined by the operating wavelength of the device, the waveguide's height H, width W, refractive index values of the emitter $n_e$, base $n_b$, and collector $n_c$, refractive index values ($n_{s1}, n_{s2}, n_{s3}, n_{s4}$) of one or more surrounding materials adjacent to the waveguide core, and radius of curvature of the waveguide core. Instead of traveling along or parallel to a plane of the EB junction 115 (as for the case of FIG. 1B), the optical mode travels perpendicular to multiple planes of EB junctions 115. Such a direction of travel may provide a more uniform phase change across the optical mode's wavefront. The width of the base $W_b$, measured at a location of the selected region 105 where the peak intensity of the optical mode passes through the base 120, can be between 20 nm and 800 nm.

Figure 2D:
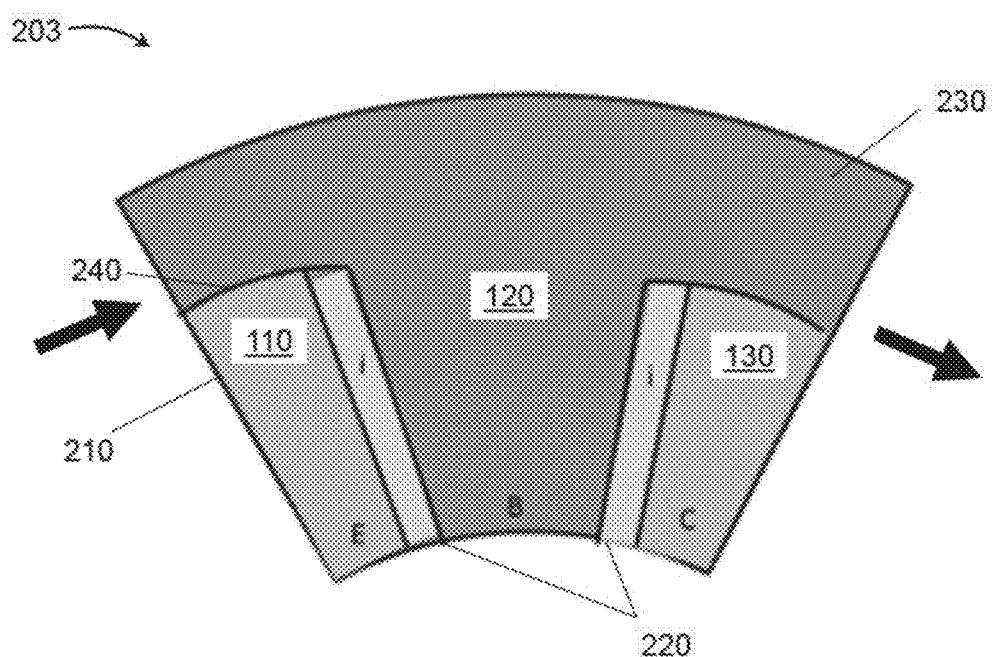
FIG. 2D depicts a curved waveguide having an interleaved BJT structure formed therein.

FIG. 2D depicts a plan view of a portion of a curved waveguide 210 having an interleaved BJT structure 203 formed therein. The BJT structure 203 includes intrinsic regions 220 between the base 120 and emitter 110 and between the base and collector 130. The intrinsic regions 220 can reduce junction capacitance as described above. The emitter 110 and collector 130 extend part way across a width of the waveguide 210, in a direction from the inner edge to the outer edge of the curved waveguide. The BJT structure 203 includes an outer, extended base region 230 that may extend along an outer curve or circumference of the curved waveguide. The extended base region 230 can form circumferential junctions 240 along which additional minority carriers may be injected into the extended base region. The additional minority carriers may interact with the optical mode traveling along a direction indicated by the heavy arrows in FIG. 2D to increase the modulation efficiency of the device compared to the structure of FIG. 2C.

Figure 2E:
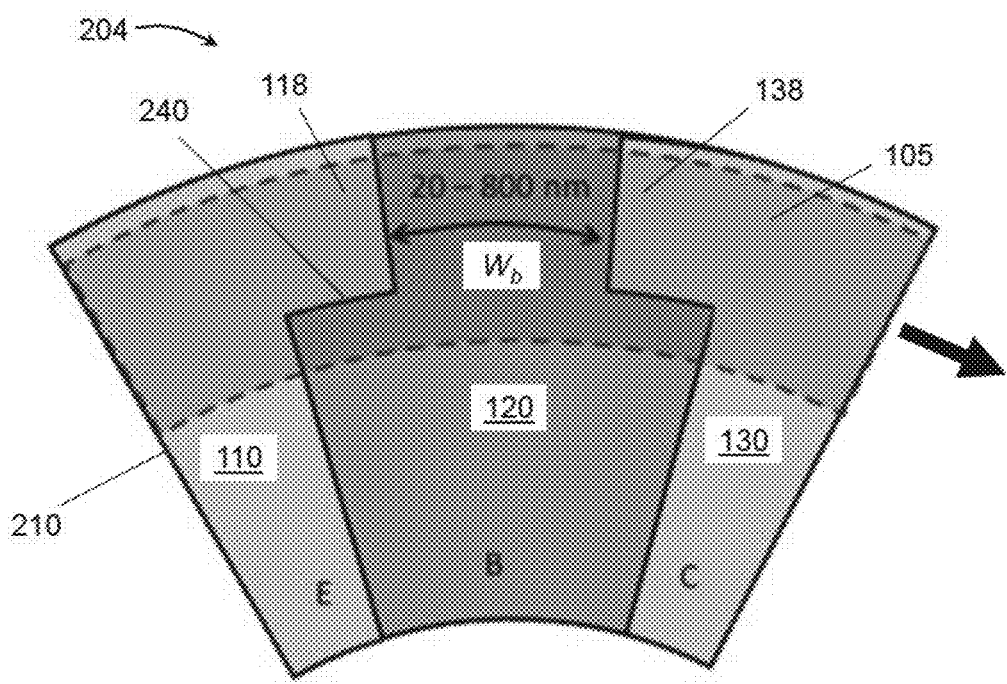
FIG. 2E depicts a curved waveguide having an interleaved BJT structure formed therein.

FIG. 2E depicts a plan view of a portion of a curved waveguide 210 having an interleaved BJT structure 204 formed therein. For this implementation, an emitter extension 118 and/or a collector extension 138 can be formed along an outer edge or in a peripheral region of the curved waveguide 210. For some optical modulators (such as ring resonators and racetrack resonators), it may be beneficial to have the peak intensity of the optical mode located nearer an outer edge of the curved waveguide 210 rather than in the middle or closer to an inner edge of the curved waveguide. Accordingly, the selected region 105 (indicated by the shaded area within the dashed lines) may be located closer to an outer edge of the curved waveguide 210 than an inner edge. In some cases, the waveguide 210 can be sized to support multiple transverse optical modes. A lowest order mode, which has a peak intensity closer to an outer edge of the curved waveguide can be selectively excited with optical component that couple an optical wave into the curved waveguide 210. Locating the optical mode near an outer edge can reduce optical losses from metal contacts of the emitter, base, and collector regions that can be located near or at an inner edge of the curved waveguide 210. The emitter extension 118 and/or collector extension 138 can increase minority-carrier concentrations in the selected region 105 (e.g., by increasing the forward bias electric field in that region and by providing circumferential junctions 240). In such an embodiment, the width of the base $W_b$ may be a shortest distance between emitter 110 and collector 130 in the selected region 105.

Figure 2F:
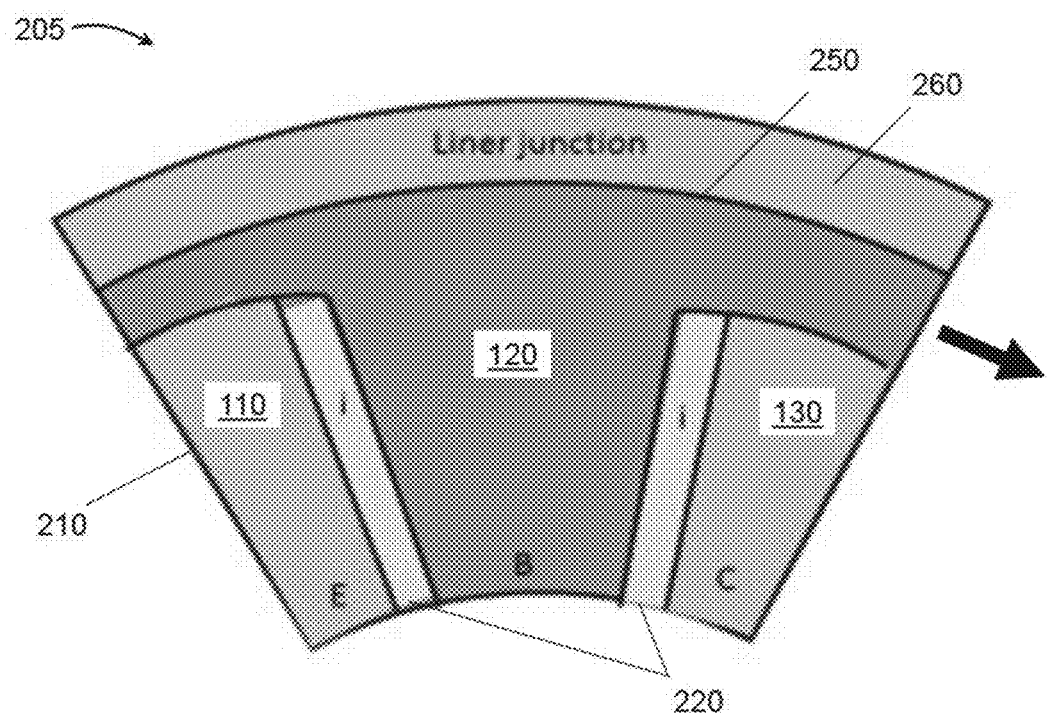
FIG. 2F depicts a curved waveguide having an interleaved BJT structure formed therein.

FIG. 2F depicts a plan view of a portion of a curved waveguide 210 having an interleaved BJT structure 205 formed therein. This implementation is similar to that of FIG. 2D, except that an additional junction 250 with the base 120 has be formed along a peripheral region of the curved waveguide 210. The additional junction may be formed by doping an outer region 260 of the waveguide to have a conductivity type opposite that of the base. There may or may not be an intrinsic region 220 located between the outer region 260 and base 120. The outer region 260 and junction 250 may extend along the emitter 110, base 120, and collector 130 and be separated from the emitter and collector by extended regions of the base 120. In some cases, the outer region 260 may instead be formed as an inner region extending along an interior of the curved waveguide 210 and the emitter and collector may be located along an outer edge of the curved waveguide.

In some implementations, the additional junction 250 and outer region can help confine minority carriers to a smaller base region from which they can diffuse more quickly to the collector 130 and be removed from the active region. The area of confinement can also be within a selected region 105 through which the peak intensity of an optical wave passes. In some cases, the outer region 260 may be doped and biased as an additional collector 130 or formed as an extension of the collector region to accelerate removal of minority carriers from the base 120. In some cases, the outer region 260 may be doped and biased as an additional emitter 110 or formed as an extension of the emitter region to increase the concentration of minority carriers injected into the base 120 and improve modulation efficiency.

Although the BJT structures are depicted for portions of curved waveguides in FIG. 2C through FIG. 2F, the interleaved BJT structures may be implemented with straight waveguides. For example, the wedged sections may be rectangular slab sections in straight waveguides. The structures depicted in FIG. 2A and FIG. 2B may also be implemented with straight or curved waveguides.

Figure 3:
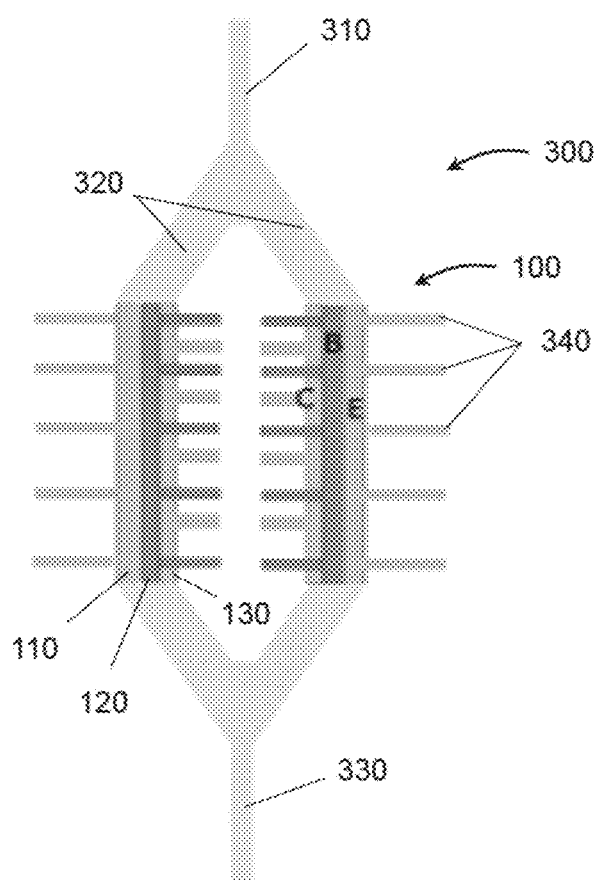
FIG. 3 depicts an optical modulator having a Mach-Zehnder interferometer that includes bipolar junction transistor structure in arms of the interferometer.

FIG. 3 depicts a Mach-Zehnder optical modulator 300 that can include BJT structures 100 in one or both arms 320 of a Mach-Zehnder interferometer. The Mach-Zehnder modulator 300 comprises an input waveguide 310, two arms 320 into which an optical wave from the input waveguide 310 can be divided, and an output waveguide 330. By modulating the phase of the optical wave in one or both arms 320 of the interferometer, the intensity of an optical wave from the output waveguide 330 can be modulated.

A BJT structure 100 having an emitter 110, base 120, and collector 130 can be patterned in one or both arms 320 of the Mach-Zehnder interferometer. When included in both arms, the BJT structure in one arm may be modulated out of phase with BJT structure in the other arm. The BJT structure may be any of those described in connection with FIG. 2A through FIG. 2F. Metal interconnects 340 or wire bonds can connect to the emitter contact, base contact, and collector contact to operate the optical modulator. There may be multiple wire bonds or multiple interconnects 340 connected to each emitter, base, and collector contact to reduce inductance and improve modulation speed.

During operation, the BE junction(s) can be modulated in a forward-biased regime. The BC junction(s) can be reverse-biased by a voltage amount between 0.1 V and 20 V. Larger reverse-bias values may be used for wide-bandgap semiconductors, such as gallium nitride. Small reverse-bias values may be used for narrow-bandgap semiconductors, such as indium phosphide. The peak forward-biased voltage may have a value between 0.2 V and 2 V for some semiconductors such as silicon, though lower values (down to 0.1 V) and higher values (up to 5 V) may be used for other semiconductors. The change in forward-bias modulating voltage between an ON state of the optical modulator and an OFF state may be between 1 mV and 1 V. The modulation of the BE junction(s) can change the minority-carrier concentration in BJT structures in one or both arms of the Mach-Zehnder modulator 300. The change in minority-carrier concentration changes the index of refraction of the semiconductor, which can be calculated using the Kramers-Kronig relations. The change in the refractive index changes the optical path length in an arm (or differential optical path length between two arms of the interferometer) and thereby changes the phase of an optical wave passing through the injected carriers, which in turns causes a change in optical intensity output from the output waveguide 330. For example, optical waves from each interferometer arm 320 that previously added constructively to produce a peak output intensity from the output waveguide may add destructively (due to the injected carriers and refractive index change) to produce a minimum output intensity from the output waveguide 330. The 3 dB modulation frequency of the optical modulator 300 may be between 1 GHz and 10 GHZ.

Figure 4:
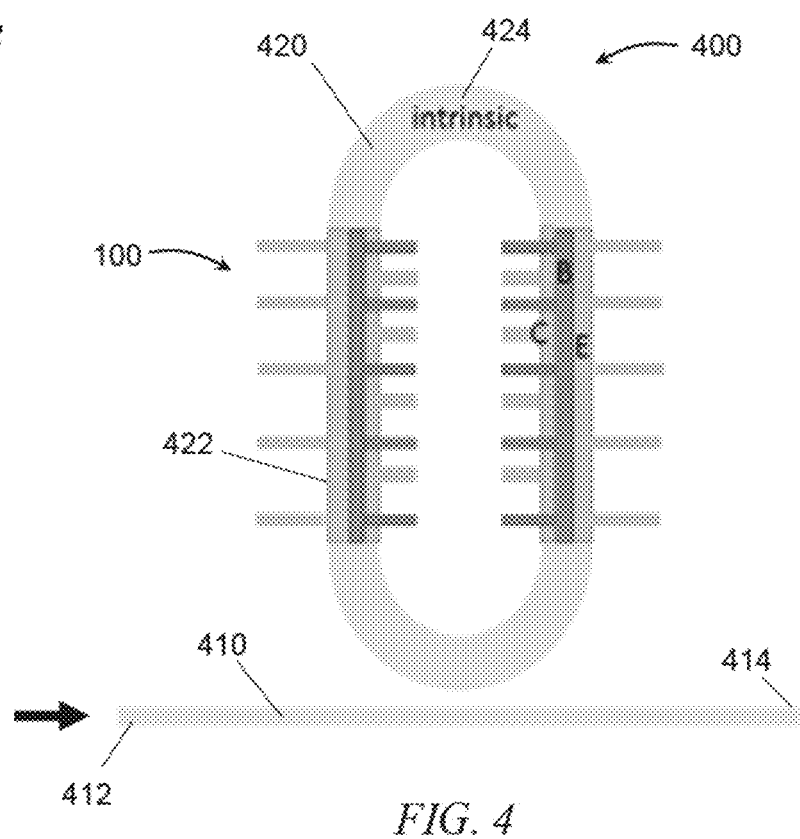
FIG. 4 depicts an optical modulator comprising a racetrack resonator that includes bipolar junction transistor structure in the racetrack waveguide of the resonator.

FIG. 4 depicts an optical modulator 400 having a racetrack resonator that includes BJT structure 100 formed in the racetrack waveguide 420 of the resonator. The optical modulator 400 comprises BJT structure 100 formed along straight waveguide portions 422 of the racetrack waveguide 420. In some implementations, the BJT structure 100 can be formed additionally or alternatively along one or both curves 424 in the racetrack waveguide 420. The BJT structure may be any of those described in connection with FIG. 2A through FIG. 2F.

The racetrack waveguide 420 can optically couple to a bus waveguide 410 having an input 412 and output 414. For an operating wavelength, the amount of coupling between the bus waveguide 410 and the racetrack waveguide 420 and an output intensity at the output 414 can depend upon an optical path length (OPL) for an optical wave traveling around the racetrack waveguide 420. The OPL can be changed by the injection of minority carriers by the BJT structure 100. Changing the OPL changes the intensity at the output 414 of the optical modulator 400. Accordingly, the intensity of an optical wave at the output 414 can be modulated by modulation of the forward-bias voltage on the BE junctions of the BJT structures 100, as described above in connection with FIG. 3. The BC junction(s) can be reverse-biased by a voltage amount between 0.1 V and 20 V. The peak forward-biased voltage applied to the BE junction(s) may have a value between 0.1 V and 5 V. The change in forward-bias voltage between an ON state of the optical modulator and an OFF state may be between 1 mV and 1 V. The 3 dB modulation frequency of the optical modulator 400 may be between 1 GHz and 10 GHZ.

Figure 5:
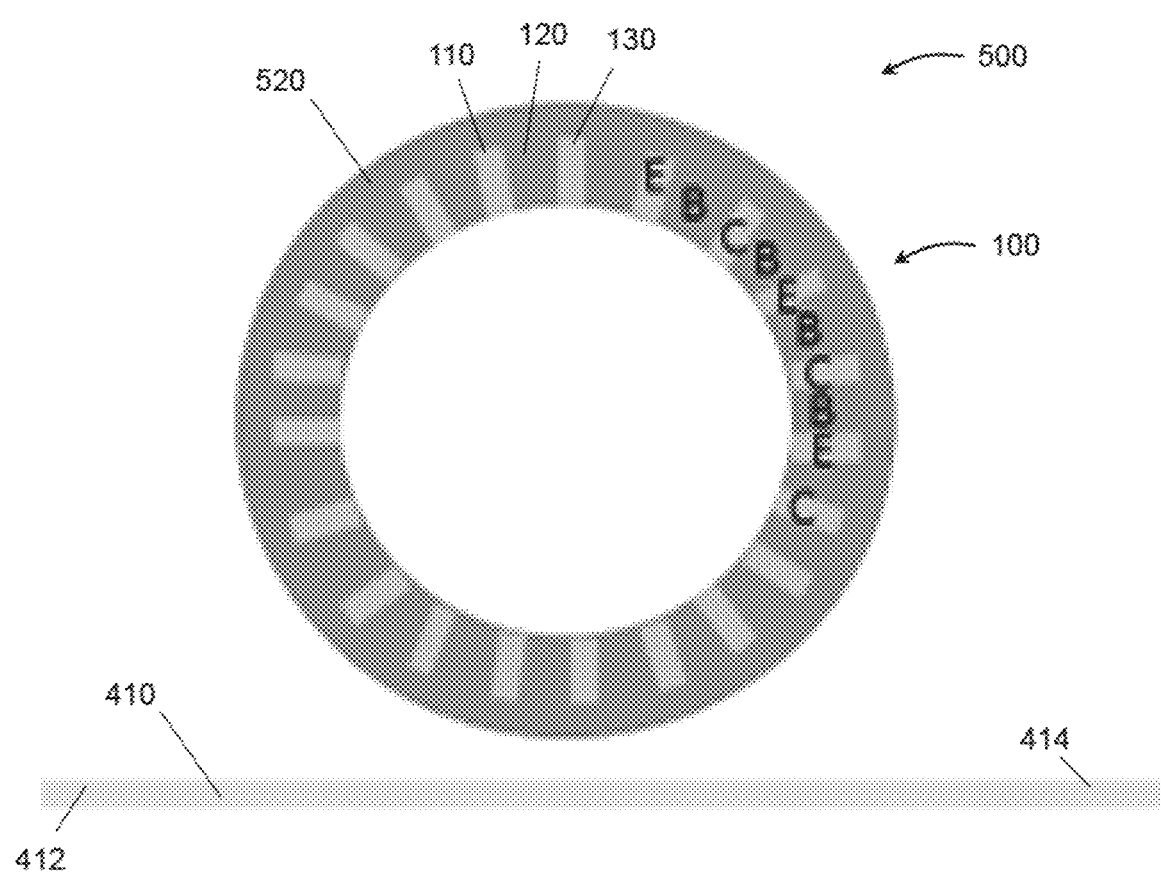
FIG. 5 depicts an optical modulator comprising a ring resonator that includes bipolar junction transistor structure in the ring waveguide of the resonator.

FIG. 5 depicts an optical modulator 500 having a circular or ring waveguide 520 that forms a ring resonator. The ring waveguide 520 is optically coupled to a bus waveguide 410 having an input 410 and output 420. A plurality of BJT structures 100 having emitters 110, bases 120, and collectors 130 can be formed around the ring waveguide 520. In some implementations, conductive interconnects (not shown) may connect to emitter contacts, base contacts, and collector contacts that may be located at an interior of the ring waveguide 520. The BJT structures may be any of those described in connection with FIG. 2C through FIG. 2F. In alternative implementations, the BJT structures of FIG. 2A or FIG. 2B may be used. The BJT structures 100 can be used to inject and rapidly remove minority carriers from the selected region 105 of the ring waveguide, which can modulate the optical intensity of an optical wave at the output 414 of the bus waveguide 410, as described above in connection with FIG. 4. A center of the selected region 105 and optical mode may be located closer to an outer edge of the ring waveguide than an inner edge. The 3 dB modulation frequency of the optical modulator 500 may be between 1 GHz and 10 GHZ.

The waveguides shown in FIG. 3 through FIG. 5 are not drawn to scale and are illustrated roughly for explanation purposes only. At least some waveguides of the modulators may be sized and designed as single-mode optical waveguides (i.e., to support only a single transverse optical mode propagating in the waveguide) at the operational wavelength of the optical modulator. The operational wavelength of the optical modulator may be between 800 nm and 2 µm and may be determined by a communication system, in some cases, in which the optical modulator is located.

Optical modulators described above can be used for various applications. One application is optical communications (e.g., high-speed, fiber-optic and photonic communication systems.) The optical modulators may be fabricated on photonic chips that include electronic components using integrated electronic fabrication procedures and used in such optical communication systems.

Another possible application can be for the detection and sensing of low-power signals. For example, some sensors may be capable of producing only a few millivolts to tens of millivolts of driving signal. An optical modulator of the present embodiments may be capable of directly turning such an electrical signal into a fully-modulated (ON-to-OFF) optical signal. An example application in this area may be cryogenic readout. Some voltage signals in cryogenic technologies are less than 5 mV. An optical modulator as described herein, having BJT structure and configured for high modulation efficiency, could be directly driven by cryogenic sensors having such low voltage signals to communicate information optically and with less noise from the cryogenic environment to an ambient environment at room temperature. Examples of cryogenic sensors and detectors include, but are not limited to, superconducting nanowire single-photon detectors, cryogenic cameras, and Josephson junction detectors and sensors. When used with such devices, optical modulators described herein may be useful for superconducting and trapped-ion qubit readout and/or superconducting (single flux quantum) computing. In a cryogenic environment, the modulation efficiency of the optical modulators described herein may be improved compared to room temperature operation.

Various configurations of optical devices that include BJT structure for modulating an optical wave are possible. Some example configurations are listed below.

(1) An optical device to modulate an optical wave passing through the optical device, the optical device comprising: an optical waveguide; a first doped region in the optical waveguide forming an emitter of a bipolar junction transistor; a second doped region in the optical waveguide forming a base of the bipolar junction transistor; a third doped region forming a collector of the bipolar junction transistor, wherein a base-emitter junction comprising the base and the emitter is configured to operate in a forward-bias mode and a base-collector junction comprising the base and the collector is configured to operate in a reverse-bias mode to modulate the optical wave.

(2) The optical device of configuration (1), further comprising: a selected region within the optical waveguide for the optical wave to pass through, the optical wave having a transverse optical mode profile when present in the optical waveguide, wherein the selected region is a region within which a peak intensity of the optical mode down to a 1/e intensity value is contained, and a center of the selected region is located between the base-emitter junction and the base-collector junction.

(3) The optical device of configuration (1), further comprising: a selected region within the optical waveguide for the optical wave to pass through, the optical wave having a transverse optical mode profile when present in the optical waveguide, wherein the selected region is a region within which a peak intensity of the optical mode down to a 1/e intensity value is contained, and a center of the selected region is located less than 300 nm from a center of the base-emitter junction.

(4) The optical device of any one of configurations (1) through (3), wherein a distance between a center of the base-emitter junction and a center of the base-collector junction has a value from 20 nm to 800 nm.

(5) The optical device of any one of configurations (1) through (4), wherein the bipolar junction transistor has n-p-n conductivity types in the emitter, the base, and the collector, respectively.

(6) The optical device of any one of configurations (1) through (5), wherein the base and the emitter are formed in silicon.

(7) The optical device of any one of configurations (1) through (6), wherein the base-emitter junction comprises a vertical junction within the optical waveguide.

(8) The optical device of any one of configurations (1) through (6), wherein the base-emitter junction comprises a lateral junction within the optical waveguide.

(9) The optical device of any one of configurations (1) through (8), further comprising: a first intrinsic region located between the base and the emitter to reduce base-emitter junction capacitance; and a second intrinsic region located between the base and the collector to reduce base-collector junction capacitance.

(10) The optical device of any one of configurations (1) through (9), wherein the optical waveguide is curved, further comprising: a selected region within the optical waveguide for the optical wave to pass through, the optical wave having a transverse optical mode profile when present in the optical waveguide, wherein the selected region is a region within which a peak intensity of the optical mode down to a 1/e intensity value is contained; and an emitter extension along an outside edge of the curved optical waveguide, the emitter extension protruding into the base, wherein a center of the selected region is located closer to the outside edge than to an inside edge of the curved optical waveguide.

(11) The optical device of any one of configurations (1) through (9), wherein the optical waveguide is curved and wherein the emitter and the collector extend only part way across a width of the optical waveguide and the base extends beyond the emitter and the collector across the width of the optical waveguide.

(12) The optical device of any one of configurations (1) through (11), further comprising: a fourth doped region extending within the optical waveguide along the emitter, the base, and the collector, wherein the fourth doped region has a same conductivity type as the collector and is separated from the emitter and the collector by extended regions of the base.

(13) The optical device of any one of configurations (1) through (12) included in a Mach-Zehnder interferometer.
(14) The optical device of any one of configurations (1) through (12) included in a racetrack resonator.
(15) The optical device of any one of configurations (1) through (12) included in a ring waveguide of a ring resonator.
(16) The optical device of any one of configurations (13) through (15), further comprising: a bus waveguide optically coupled to the optical waveguide.

Various methods of operating optical devices that include BJT structure for modulating an optical wave, such as those in the above configurations, are possible. Some example methods are listed below.

(17) A method of modulating an optical wave, the method comprising: passing the optical wave through an optical waveguide containing at least a portion of a bipolar junction transistor (BJT) structure, wherein a peak intensity of the optical wave passes within 300 nm of a peak change in injected minority-carrier concentration within a base of the BJT structure; electrically modulating, under forward-bias conditions, a base-emitter junction of the BJT structure to change the injected minority-carrier concentration; and reverse biasing a base-collector junction of the BJT structure to remove minority carriers from the base of the BJT structure.
(18) The method of (17), wherein the modulating is performed at a frequency or has a frequency component between 1 GHz and 10 GHz.
(19) The method of (17) or (18), wherein a distance between a center of the base-emitter junction and a center of the base-collector junction has a value from 20 nm to 800 nm.
(20) The method of any one of (17) through (19), wherein a change in the modulating voltage is between 2 mV and 1 V.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical device to modulate an optical wave passing through the optical device, the optical device comprising:
   an optical waveguide;
   a first doped region in the optical waveguide forming an emitter of a bipolar junction transistor;
   a second doped region in the optical waveguide forming a base of the bipolar junction transistor;
   a third doped region forming a collector of the bipolar junction transistor, wherein a base-emitter junction between the base and the emitter is configured to operate in a forward-bias mode and a base-collector junction between the base and the collector is configured to operate in a reverse-bias mode to modulate the optical wave; and
   a selected region within the optical waveguide for the optical wave to pass through, the optical wave having a transverse optical mode profile when present in the optical waveguide, wherein
   the selected region is configured to contain the optical mode down to a 1/e intensity value relative to a peak intensity of the optical mode,
   a center of the selected region is located between the base-emitter junction and the base-collector junction, and
   the transverse optical mode profile above the 1/e intensity value is contained within a first portion of the emitter where a minority carrier concentration is greater than 20% of a peak value of the minority carrier concentration in the emitter and a second portion in the base where a minority carrier concentration in the base is greater than 20% of a peak value of the minority carrier concentration in the base.

2. The optical device of claim 1, wherein the base and the emitter are incorporated in a ridge waveguide or a rib waveguide.

3. The optical device of claim 1, wherein the center of the selected region is located less than 300 nm from a center of the base-emitter junction.

4. The optical device of claim 1, wherein a distance between a center of the base-emitter junction and a center of the base-collector junction is from 20 nm to 800 nm.

5. The optical device of claim 1, wherein the bipolar junction transistor has n-p-n conductivity types in the emitter, the base, and the collector, respectively.

6. The optical device of claim 1, wherein the base and emitter are formed in silicon.

7. The optical device of claim 1, wherein the base-emitter junction comprises a vertical junction within the optical waveguide.

8. The optical device of claim 1, wherein the base-emitter junction comprises a lateral junction within the optical waveguide.

9. The optical device of claim 1, further comprising:
   a first intrinsic region located between the base and the emitter to reduce base-emitter junction capacitance; and
   a second intrinsic region located between the base and the collector to reduce base-collector junction capacitance.

10. The optical device of claim 1, wherein the optical waveguide is curved, further comprising:
    an emitter extension along an outside edge of the curved optical waveguide, the emitter extension protruding into the base, wherein a center of the selected region is located closer to the outside edge than to an inside edge of the curved optical waveguide.

11. The optical device of claim 1, wherein the optical waveguide is curved and wherein the emitter and the collector extend partially across a width of the optical waveguide and the base extends beyond the emitter and the collector across the width of the optical waveguide.

12. The optical device of claim 1, further comprising:
    a fourth doped region extending within the optical waveguide along the emitter, the base, and the collector, wherein the fourth doped region has a same conductivity type as the collector and is separated from the emitter and the collector by extended regions of the base.

13. The optical device of claim 1 included in a Mach-Zehnder interferometer.

14. The optical device of claim 1 included in a racetrack resonator.

15. The optical device of claim 1 included in a ring waveguide of a ring resonator.

16. The optical device and ring resonator of claim 15, further comprising:
    a bus waveguide optically coupled to the ring waveguide.

17. A method of modulating an optical wave, the method comprising:
    passing the optical wave through an optical waveguide containing at least a portion of a bipolar junction transistor (BJT) structure, wherein a peak intensity of the optical wave passes within 300 nm of a peak change in an injected minority-carrier concentration within a base of the BJT structure, and wherein a transverse mode profile from the peak intensity down to a 1/e relative intensity level of the optical wave is contained within a first portion of an emitter of the BJT structure where a minority carrier concentration is greater than 20% of a peak value of the minority carrier concentration in the emitter and a second portion in a base of the BJT structure where a minority carrier concentration in the base is greater than 20% of a peak value of the minority carrier concentration in the base;
    electrically modulating, under forward-bias conditions, a base-emitter junction of the BJT structure to change the injected minority-carrier concentration; and
    reverse biasing a base-collector junction of the BJT structure to remove minority carriers from the base of the BJT structure.

18. The method of claim 17, wherein the modulating is performed at a frequency or has a frequency component between 1 GHz and 10 GHz.

19. The method of claim 17, wherein a distance between a center of the base-emitter junction and a center of the base-collector junction is from 20 nm to 800 nm.

20. The method of claim 17, wherein a change in the modulating voltage is between 1 mV and 1 V.

* * * * *